US010124895B2

(12) United States Patent
Simeon et al.

(10) Patent No.: US 10,124,895 B2
(45) Date of Patent: Nov. 13, 2018

(54) PRIVACY PANEL WITH VIDEO MONITOR FUNCTION FOR VEHICLE PASSENGER SEATING UNIT

(71) Applicant: B/E Aerospace, Inc., Wellington, FL (US)

(72) Inventors: Jayson C. Simeon, Round Rock, TX (US); Nathan E. Careless, Round Rock, TX (US); Steven K. Brown, Austin, TX (US); Nathan P. Wang, Austin, TX (US); Mark W. Foohey, Austin, TX (US); Heather D. Benoit, Austin, TX (US); Daniel J. Yee, Austin, TX (US); Jens P. Johnson, Austin, TX (US); Terry L. Branson, Austin, TX (US)

(73) Assignee: B/E Aerospace, Inc., Winston-Salem, NC (US)

( * ) Notice: Subject to any disclaimer, the term of this patent is extended or adjusted under 35 U.S.C. 154(b) by 168 days.

(21) Appl. No.: 15/092,924

(22) Filed: Apr. 7, 2016

(65) Prior Publication Data
US 2016/0297524 A1     Oct. 13, 2016

Related U.S. Application Data

(60) Provisional application No. 62/145,091, filed on Apr. 9, 2015.

(51) Int. Cl.
*B64D 11/06*     (2006.01)
*B64D 11/00*     (2006.01)

(52) U.S. Cl.
CPC ...... *B64D 11/0015* (2013.01); *B64D 11/0023* (2013.01); *B64D 11/0601* (2014.12);
(Continued)

(58) Field of Classification Search
None
See application file for complete search history.

(56) References Cited

U.S. PATENT DOCUMENTS

| 6,170,786 | B1 * | 1/2001 | Park | B64D 11/0601 |
|---|---|---|---|---|
| | | | | 248/274.1 |
| 7,419,214 | B2 * | 9/2008 | Plant | B64D 11/0606 |
| | | | | 244/118.6 |

(Continued)

FOREIGN PATENT DOCUMENTS

EP     2783983 A1     10/2014

OTHER PUBLICATIONS

International Search Report and Written Opinion of corresponding International Application No. PCT/US2016/026343; dated Jul. 7, 2016; 11 pages.

*Primary Examiner* — Richard R. Green
(74) *Attorney, Agent, or Firm* — Clements Bernard Walker PLLC

(57) ABSTRACT

A vehicle passenger seating unit of the type having at least first and second seats facing each other. A privacy panel is provided that includes first and second video monitors positioned between the first and second seats and selectively moveable between respective stowed positions. When both video monitors are stowed, visual interaction is permitted between seat occupants in the first and second seats. When moved to respective deployed positions between the first and second seats, privacy is provided to the seat occupants in the first and second seats.

8 Claims, 5 Drawing Sheets

(52) U.S. Cl.
CPC ...... *B64D 11/0602* (2014.12); *B64D 11/0605* (2014.12); *B64D 11/0606* (2014.12)

(56) References Cited

U.S. PATENT DOCUMENTS

| | | | | |
|---|---|---|---|---|
| 8,243,214 B2 * | 8/2012 | Park | ............ | B60R 11/0229 |
| | | | | 248/324 |
| 8,740,144 B2 * | 6/2014 | Goehlich | ............ | B64D 11/0015 |
| | | | | 244/1 R |
| 2013/0242523 A1 | 9/2013 | Wallace et al. | | |
| 2013/0279090 A1 * | 10/2013 | Brandt | ............ | H05K 7/00 |
| | | | | 361/679.01 |
| 2014/0035330 A1 | 2/2014 | Henshaw | | |
| 2014/0361585 A1 | 12/2014 | Henshaw | | |
| 2015/0210393 A1 * | 7/2015 | Savian | ............ | B64D 11/0606 |
| | | | | 244/118.6 |
| 2016/0272323 A1 * | 9/2016 | Carlioz | ............ | B64D 11/0606 |

* cited by examiner

PRIVACY PANEL WITH VIDEO MONITOR FUNCTION FOR VEHICLE PASSENGER SEATING UNIT

TECHNICAL FIELD AND BACKGROUND OF THE INVENTION

This application relates to a privacy panel that includes a video monitor function, intended for use with a vehicle passenger seating unit such as found in business and first class cabins of passenger aircraft. Several embodiments of the video monitor functionality are disclosed.

Aircraft cabin configurations now include not only seating units arranged in ranks and files facing in the same direction, but also seats that are angled with reference to each other and with reference to a longitudinal axis of an aircraft cabin. Other arrangements include club-type seating where seats are arrayed to face each other, with a table between them in order to permit dining, collaborative work and discussion in a manner more like that which can occur in a typical office environment. However, while providing such arrangements there should also be accommodation for circumstances where privacy between occupants of facing seats is necessary or desirable. Such arrangements and accommodations should also preferably take account of the seating occupants' requirements for video functionality for either work or entertainment purposes. As internet capability is incorporated into more and more aircraft cabins, the need for suitable video equipment will become increasingly more in demand.

SUMMARY OF THE INVENTION

Therefore, it is an object of the invention to provide various privacy panels and video monitors that permit alternative arrangements that permit video monitors that can be stowed when not in use to permit interaction between proximately-seated passengers, and deployed in various ways to provide privacy and video functionality.

According to one embodiment of the invention, a video monitor is provided that includes a slide track that flips from a vertical to a horizontal position to permit the video monitor to be translated horizontally on the track between stowed and deployed use positions.

According to another embodiment of the invention, a video monitor is provided that includes a pivot around which the video monitor pivots between stowed and deployed positions.

According to another embodiment of the invention, a video monitor is provided that includes an angle of adjustment feature that allows seating occupants to adjust the angular position of the monitor around a vertical axis.

According to another embodiment of the invention, a video monitor is provided that includes an over center slide that moves the monitor into a defined stowed or deployed position.

According to another embodiment of the invention, a privacy panel is provided that also functions as a projection surface onto which a projector is adapted to project images.

These and other objects and advantages are achieved by providing a vehicle passenger seating unit of the type having at least first and second seats facing each other. A privacy panel is provided that includes first and second video monitors positioned between the first and second seats and selectively moveable between respective stowed positions. When both video monitors are stowed, visual interaction is permitted between seat occupants in the first and second seats. When moved to respective deployed positions between the first and second seats, privacy is provided to the seat occupants in the first and second seats.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT AND BEST MODE

Figure 1:
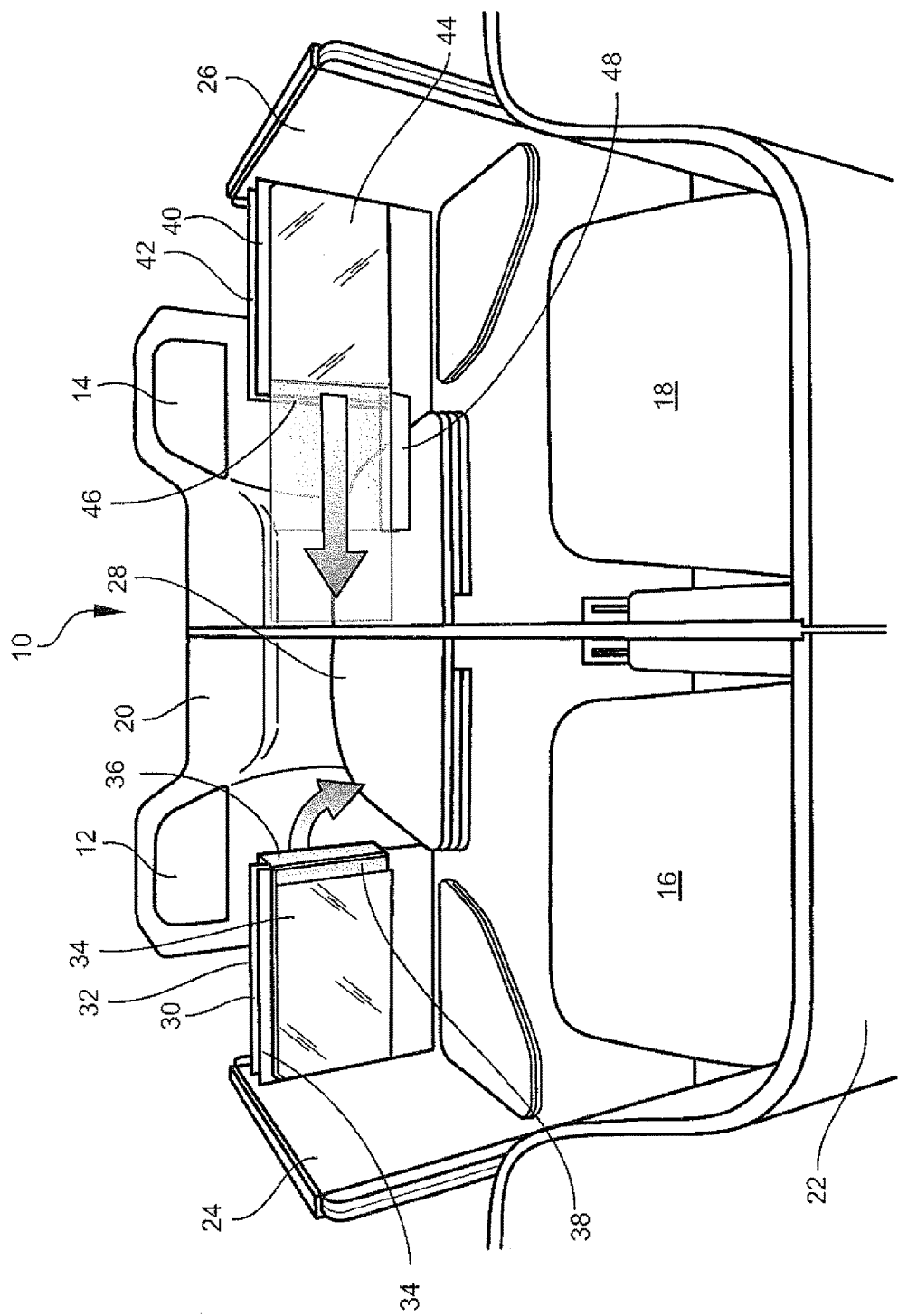
FIG. 1 illustrates a multi-seat seating unit that includes a video monitor with a slide track that flips from a vertical to a horizontal position to permit the video monitor to be translated horizontally on the track between stowed and deployed use positions.

Referring now to the drawings, FIG. 1 shows a passenger seating unit 10 that includes four seats 12, 14, 16, 18 positioned within privacy shell elements 20, 22, 24, 26 as shown. Seats 12 and 14 are positioned next to each other and face in the same general direction. Seats 14 and 18 are positioned next to each other and face in the opposite direction of seats 12, 14 so that the seat occupants in seats 12, 14 and 16, 18 face each other and can more easily interact with each other. The seating units 12, 14 and 16, 18 include various comfort and safety features found in such seats, not shown.

The passenger seating unit 10 includes a centrally positioned table 28 which can serve as a dining, work or game table, as desired by the seat occupants. In FIG. 1, first and second privacy panels 30, 40 are shown. Video monitors 32, 34 for the occupants of seats 12 and 16 are shown in a stowed position, where the video monitors 32 and 34 reside in the stowed position against the privacy panel 30 in an area between the privacy shell element 24 and the table 28. In this position video monitors 32 and 34 are viewable by the occupants of seats 12 and 16. Flip down guide tracks 36, 38 are provided that deploy from the shown vertical position into a horizontal position on the table 28. The tracks 36, 38 have guides, such as a recessed groove, rollers, or raised channel by which the video monitors 32, 34 can be slid laterally inwardly along the table 28, forming an extended privacy panel whether or not actually in use displaying video content. The video monitors 32, 34 are also viewable in this position.

Similarly, video monitors 42, 44 for the occupants of seats 14 and 18 are shown in a stowed position, where the monitors 42 and 44 reside in the stowed position against the privacy panel 40 in an area between the privacy shell element 26 and the table 28. Flip down guide tracks 46, 48 are provided that deploy from a vertical position into a horizontal position on the table 28. Guide track 48 is shown in its deployed position. The tracks 46, 48 have guides, such as a recessed groove, rollers, or raised channel by which the video monitors 42, 44 can be slid laterally inwardly along the table 28, forming an extended privacy panel whether or not actually in use displaying video content. Any seat occupant may deploy or stow his or her video monitor 32, 34, 42, 44 independently of the preferences of any other seat occupant.

Figure 2:
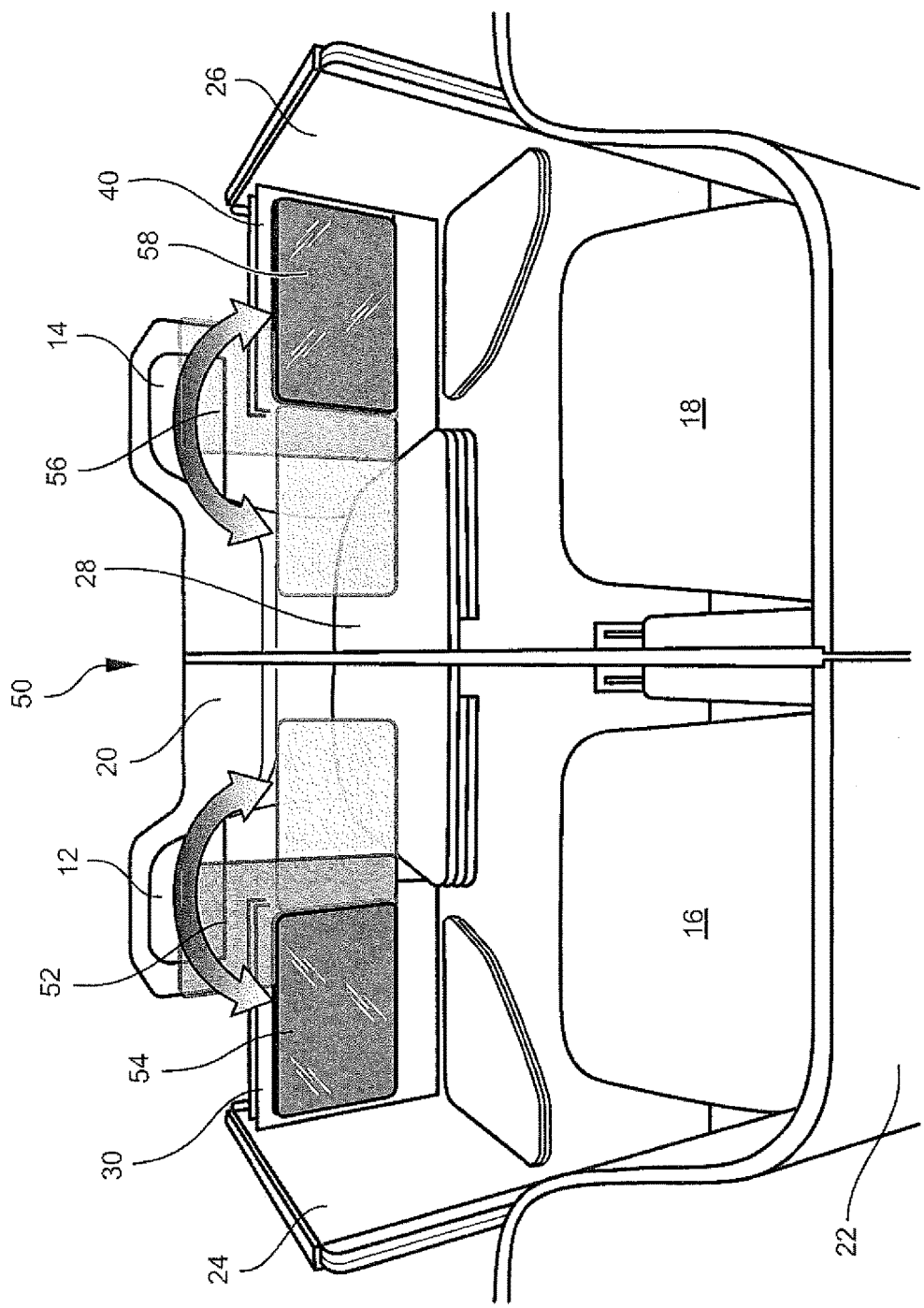
FIG. 2 illustrates a multi-seat seating unit that includes a video monitor with a pivot around which the video monitor rotates between stowed and deployed positions.

FIG. 2 shows a passenger seating unit 50 that includes four seats 12, 14, 16, 18 positioned within privacy shell elements 20, 22, 24, 26, as shown. Seats 12 and 14 are positioned next to each other and face in the same general direction. Seats 14 and 18 are positioned next to each other and face in the opposite direction of seats 12, 14 so that the seat occupants can interact with each other. The seating units 12, 14, 16, 18 include various comfort and safety features found in such seats, not shown.

The passenger seating unit 50 includes a centrally positioned table 28 which can serve as a dining, work or game table, as desired by the seat occupants. In FIG. 2, first and second privacy panels 30, 40 are shown. Video monitors 52, 54 for the occupants of seats 12 and 16 are shown, where monitor 52 is shown being rotated around a horizontal pivot 180 degrees into a deployed position on the table 28 where it can serve as an extended privacy panel whether or not actually being used to display video content. Video monitor 54 is shown in its stowed position.

Similarly, video monitors 56, 58 for the occupants of seats 14 and 18 are shown, where monitor 54 is shown being rotated around a horizontal pivot 180 degrees into a deployed position on the table 28 where it can serve as an extended privacy panel whether or not actually being used to display video content. Monitor 58 is shown in its stowed position. In each case, the privacy panels 30, 40 include a horizontally-mounted pivot mechanism, not shown, to which the respective monitors 52, 54 and 56, 58 are mounted for rotational movement between the stowed and deployed positions.

Figure 3:
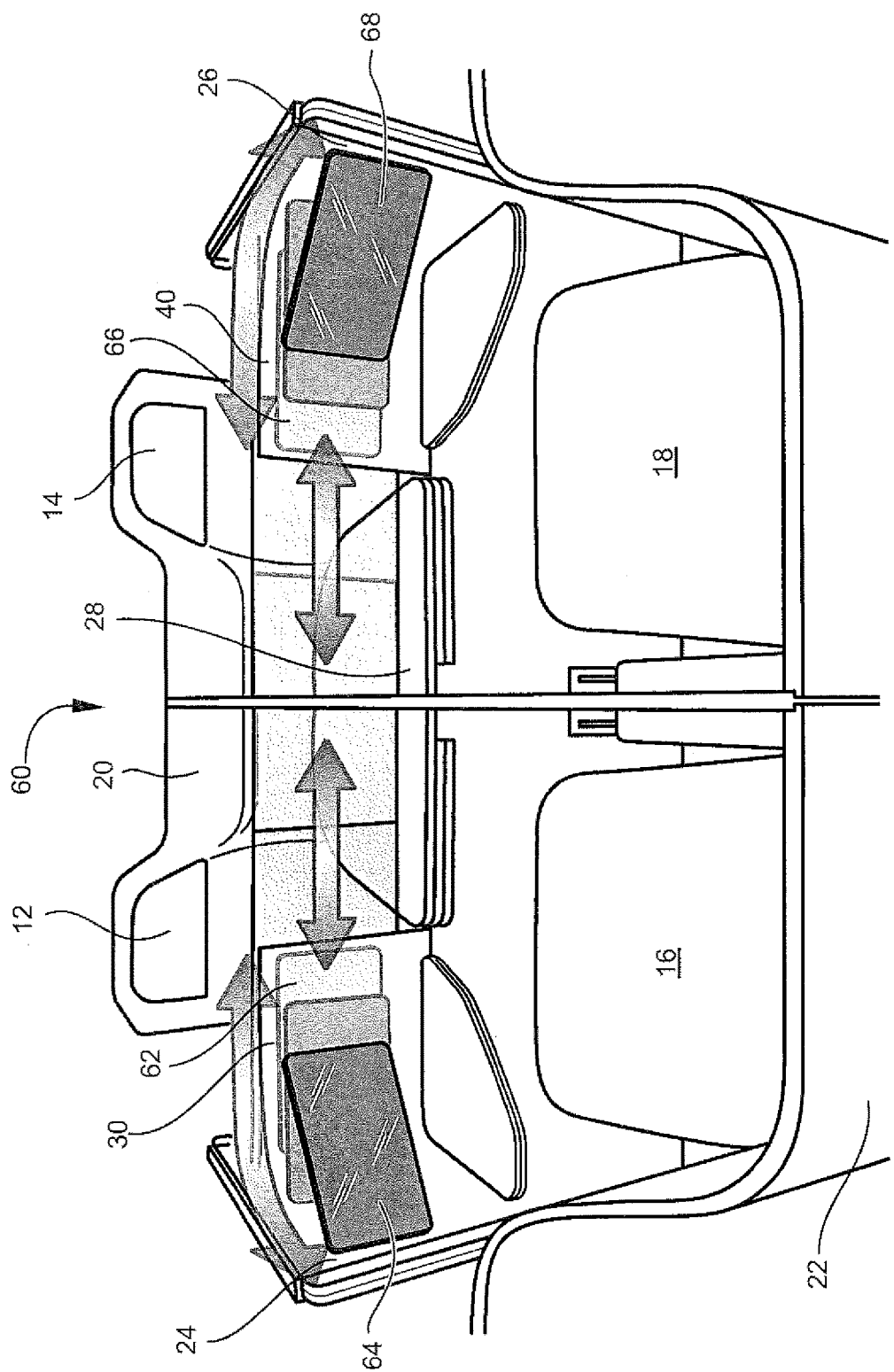
FIG. 3 illustrates a multi-seat seating unit that includes a video monitor with an angle of adjustment feature that allows seating occupants to adjust the angular position of the monitor around a vertical axis.

Referring now to FIG. 3, a multi-seat passenger seating unit 60 is shown, with four seats 12, 14, 16, 18 positioned within privacy shell elements 20, 22, 24, 26. Seats 12 and 14 are positioned next to each other and face in the same general direction. Seats 14 and 18 are positioned next to each other and face in the opposite direction of seats 12, 14 so that the seat occupants can interact with each other. The seating units 12, 14, 16, 18 include various comfort and safety features found in such seats, not shown.

The passenger seating unit 60 includes a centrally positioned table 28 which can serve as a dining, work or game table, as desired by the seat occupants. In FIG. 3, first and second privacy panels 30, 40 are shown. Video monitors 62, 64 for the occupants of seats 12 and 16 are shown, where monitor 64 is shown in a stowed position from which it can be translated from the stowed position adjacent to and at an oblique angle to the privacy shell element 24 into a deployed position on the table 28 where it can serve as an extended privacy panel whether or not actually being used to display video content. Monitor 62 is shown in an intermediate position between fully stowed and fully deployed.

Similarly, video monitors 66, 68 for the occupants of seats 14 and 18 are shown, where monitor 68 is shown in a stowed position adjacent to and at an oblique angle to the privacy shell element 26 from which it can be translated into a deployed position on the table 28 where it can serve as an extended privacy panel whether or not actually being used to display video content. Monitor 68 is shown in its stowed position. In each case, the monitors 62, 64 and 66, 68 are mounted for guided translating movement between the stowed and deployed positions, such as by a recessed groove, rollers or raised tracks.

Figure 4:
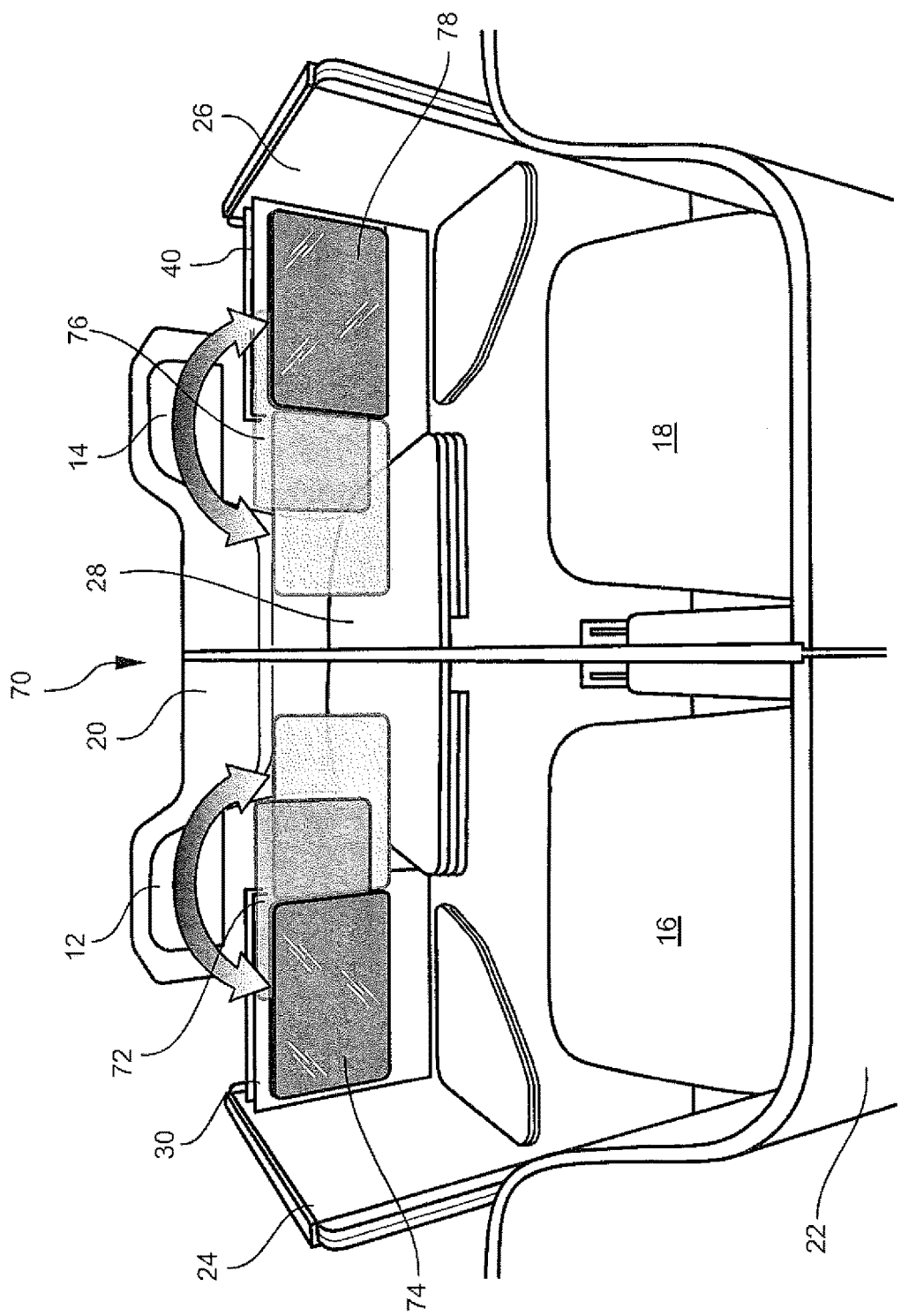
FIG. 4 illustrates a multi-seat seating unit that includes a video monitor with an over center slide that moves the monitor into a defined stowed or deployed position.

Referring now to FIG. 4, a multi-seat seating unit 70 is shown that includes four seats 12, 14, 16, 18 positioned within privacy shell element 20, 22, 24, 26. Seats 12 and 14 are positioned next to each other and face in the same general direction. Seats 14 and 18 are positioned next to each other and face in the opposite direction of seats 12, 14 so that the seat occupants can interact with each other. The seating units 12, 14, 16, 18 include various comfort and safety features found in such seats, not shown.

The passenger seating unit 70 includes a centrally positioned table 28 which can serve as a dining, work or game table, as desired by the seat occupants. In FIG. 4, first and second privacy panels 30, 40 are shown. Video monitors 72, 74 for the occupants of seats 12 and 16 are shown, where monitor 74 is shown in a stowed position from which it can be lifted in an over-center manner from the stowed position adjacent to the privacy shell element 24 and lowered into a deployed position on the table 28 where it can serve as an extended privacy panel whether or not actually being used to display video content. Monitor 72 is shown in an intermediate position between fully stowed and fully deployed, illustrating the lifting of the monitor 72 into the deployed position where it is lowered onto the table 28.

Similarly, video monitors 76, 78 for the occupants of seats 14 and 18 are shown, where monitor 78 is shown in a stowed position from which it can be translated into a deployed position on the table 28 where it can serve as an extended privacy panel whether or not actually being used to display video content. Monitor 76 is shown in an intermediate position between the stowed and deployed position. In each case, the monitors 72, 74 and 76, 78 are mounted for guided translating movement between the stowed and deployed positions, such as by a recessed groove, rollers or raised tracks.

Figure 5:
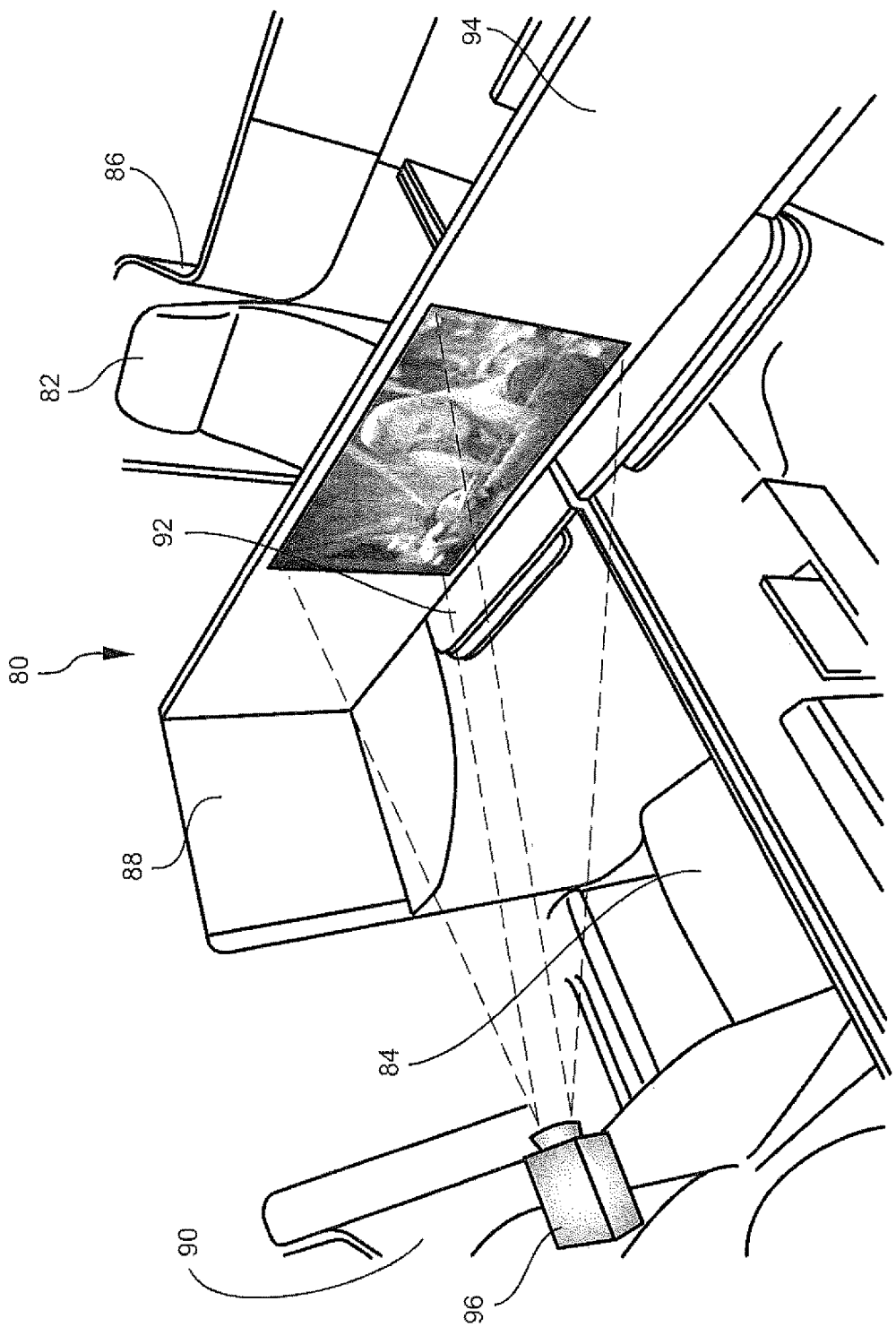
FIG. 5 illustrates a multi-seat seating unit that includes a privacy panel that also functions as a projection surface onto which a projector is adapted to project images.

Referring now to FIG. 5 illustrates a fragmentary view of a multi-seat seating unit 80 that includes at least seats 82, 84 enclosed within privacy shell elements 86, 88 and 90. In a full view other seats and shell elements would be shown. Compare with FIGS. 1-4. A table 92 is positioned in the seating unit 80 which can serve as a dining, work or game table, as desired by the seat occupants. A privacy panel 94 is positioned for use by the seat occupants when deployed, and which can be stowed when the occupants desire to interact. While not shown, the privacy panel 94 may be formed as segments in different manners to permit the privacy panel 94 to be folded, slid past each other into a nested or overlapping configuration, or otherwise positioned to stow adjacent the shell 88 and the corresponding shell, not shown, on the opposite side of the seating unit 80. This leaves the central area of the seating unit 80 open for occupant interaction and use of the table 92. When the privacy panel 94 is deployed into its full length as shown in FIG. 5, it becomes a surface onto which video may be projected by a video projector 96, as shown. The surface of the privacy panel 94 therefore has visual and reflective characteristics that permit effective use as a projection surface. Both surfaces may serve as a projection surface so that seat occupants on both sides of the privacy panel 94 can view video at the same time from respective projectors.

Privacy panels that include a video monitor function intended for use with a vehicle passenger seating unit are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A vehicle passenger seating unit, comprising:
a first seat disposed in the vehicle passenger seating unit accessible from a first aisle;
a second seat disposed in the vehicle passenger seating unit accessible from the first aisle, the second seat positioned across from the first seat and facing in a direction of the first seat;
a table disposed in vehicle passenger seating unit between the first and second seats for shared use;
a first privacy panel disposed between the first and second seats;
a first video monitor disposed on a first side of the first privacy panel for use by an occupant in the first seat, the first video monitor moveable between a first position forward of the first side of the first privacy panel and a second position alongside the first privacy panel and over the table;
a second video monitor disposed on a second side of the first privacy panel for use by an occupant in the second seat, the second video monitor moveable between a first position forward of the second side of the first privacy panel and a second position alongside the first privacy panel and over the table; and
a first guide track disposed along a side of the first privacy panel adjacent the center table, the first guide track deployable from a vertical orientation to a horizontal orientation along which the first and second video monitors travel between their respective first and second positions.

2. The vehicle passenger seating unit of claim 1, further comprising:
a third seat disposed in the vehicle passenger seating unit accessible from a second aisle and positioned laterally adjacent the first seat;
a fourth seat disposed in the vehicle passenger seating unit accessible from the second aisle and positioned laterally adjacent the second seat and facing in a direction of the third seat;
the table further disposed in the vehicle passenger seating unit between the third and fourth seats;
a second privacy panel disposed between the third and fourth seats;
a third video monitor disposed on a first side of the second privacy panel for use by an occupant in the third seat, the third video monitor moveable between a first position forward of the first side of the second privacy panel and a second position alongside the second privacy panel and over the table;
a fourth video monitor disposed on a second side of the second privacy panel for use by an occupant in the fourth seat, the fourth video monitor moveable between a first position forward of the second side of the second privacy panel and a second position alongside the second privacy panel and over the table; and
a second guide track disposed along a side of the second privacy panel adjacent the center table, the second guide track deployable from a vertical orientation to a horizontal orientation along which the third and fourth video monitors travel between their respective first and second positions.

3. The vehicle passenger seating unit of claim 2, wherein the second guide track comprises at least one of a recessed groove, at least one roller, and a raised channel supporting horizontal sliding movement of the third and fourth video monitors.

4. The vehicle passenger seating unit of claim 2, wherein movement of the third video monitor between the first and second positions of the third video monitor is independent of movement of the fourth video monitor between the first and second positions of the fourth video monitor.

5. The vehicle passenger seating unit of claim 2, wherein each of the third and fourth video monitors can further move to a third position apart from the table in which each of the third and fourth video monitors is oriented at an oblique angle relative to the second privacy panel.

6. The vehicle passenger seating unit of claim 1, wherein the first guide track comprises at least one of a recessed groove, at least one roller, and a raised channel supporting horizontal sliding movement of the first and second video monitors.

7. The vehicle passenger seating unit of claim 1, wherein movement of the first video monitor between the first and second positions of the first video monitor is independent of movement of the second video monitor between the first and second positions of the second video monitor.

8. The vehicle passenger seating unit of claim 1, wherein each of the first and second video monitors can further move to a third position apart from the table in which each of the first and second video monitors is oriented at an oblique angle relative to the first privacy panel.

* * * * *